United States Patent
Kim et al.

(10) Patent No.: US 12,390,947 B2
(45) Date of Patent: Aug. 19, 2025

(54) ELECTRODE ASSEMBLY MANUFACTURING APPARATUS INCLUDING ULTRASONIC CUTTER AND METHOD USING THE SAME

(71) Applicant: LG Energy Solution, Ltd., Seoul (KR)

(72) Inventors: Tae Jong Kim, Daejeon (KR); Sang Ho Bae, Daejeon (KR); Su Taek Jung, Daejeon (KR); Joo Young Chung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 198 days.

(21) Appl. No.: 18/005,015

(22) PCT Filed: Sep. 13, 2021

(86) PCT No.: PCT/KR2021/012408
§ 371 (c)(1),
(2) Date: Jan. 10, 2023

(87) PCT Pub. No.: WO2022/055317
PCT Pub. Date: Mar. 17, 2022

(65) Prior Publication Data
US 2023/0330885 A1 Oct. 19, 2023

(30) Foreign Application Priority Data
Sep. 14, 2020 (KR) .................. 10-2020-0117858

(51) Int. Cl.
*B26D 7/08* (2006.01)
*H01M 10/04* (2006.01)

(52) U.S. Cl.
CPC ........ *B26D 7/086* (2013.01); *H01M 10/0404* (2013.01); *H01M 10/049* (2013.01)

(58) Field of Classification Search
CPC .... H01M 10/04; H01M 10/0404; H01M 4/04; H01M 4/0404; H01M 50/406;
(Continued)

(56) References Cited

U.S. PATENT DOCUMENTS 6,250,188 B1    6/2001  Sato et al.
2011/0244287 A1  10/2011  Kim et al.
(Continued)

FOREIGN PATENT DOCUMENTS

CN    1261568 A    8/2000
CN    110919750 A   3/2020
(Continued)

OTHER PUBLICATIONS

International Search Report for PCT/KR2021/012408 mailed Jan. 3, 2022. 3 pgs.
(Continued)

*Primary Examiner* — Carson Gross
(74) *Attorney, Agent, or Firm* — Lerner David LLP

(57) ABSTRACT

An electrode assembly manufacturing apparatus includes an electrode sheet supply unit for supplying an electrode sheet on which electrode mixture coating and non-coating portions are formed, a cutting unit at the rear of the supply unit for forming an electrode tab at the electrode sheet, and a lamination unit at the rear of the supply unit and configured to laminate positive and negative electrodes stacked with a separator between them. A cutting unit die supports the electrode sheet and an ultrasonic cutter spaced from the die forms the tab. A cutting line of a cutting edge of the cutter corresponds to a periphery of a unit electrode in a tab forming direction. The cutting and lamination units are on the same line in a continuous process to reduce a necessary space for electrode assembly manufacture and prevent electrode sheet foil deformation and electrode mixture layer damage in the cut section.

13 Claims, 14 Drawing Sheets

(58) Field of Classification Search
CPC ..... B26D 7/086; Y02P 70/50; B32B 37/0046; B32B 37/0053; B32B 38/0004
See application file for complete search history.

(56) References Cited

U.S. PATENT DOCUMENTS

| | | |
|---|---|---|
| 2013/0252054 A1 | 9/2013 | Barone et al. |
| 2014/0182118 A1 | 7/2014 | Kim et al. |
| 2014/0186671 A1 | 7/2014 | Kim et al. |
| 2019/0013524 A1 | 1/2019 | Kim |
| 2020/0274114 A1 | 8/2020 | Mamyoda et al. |
| 2021/0143466 A1 | 5/2021 | Shin |
| 2022/0048122 A1 | 2/2022 | Amouzegar et al. |
| 2024/0001464 A1 | 1/2024 | Amouzegar et al. |

FOREIGN PATENT DOCUMENTS

| | | | |
|---|---|---|---|
| CN | 210308473 U | | 4/2020 |
| DE | 102017218137 A1 | * | 4/2019 |
| JP | 3334511 B2 | | 10/2002 |
| JP | 2012199210 A | * | 10/2012 |
| JP | 2012240159 A | | 12/2012 |
| JP | 2013543236 A | | 11/2013 |
| JP | 2018094685 A | | 6/2018 |
| JP | 2018535516 A | | 11/2018 |
| JP | 2019038087 A | | 3/2019 |
| JP | 2019202520 A | * | 11/2019 |
| JP | 6815185 B2 | | 1/2021 |
| KR | 100647199 B1 | | 11/2006 |
| KR | 101108118 B1 | | 1/2012 |
| KR | 20130108387 A | | 10/2013 |
| KR | 101586121 B1 | | 1/2016 |
| KR | 20160014370 A | | 2/2016 |
| KR | 20160048527 A | | 5/2016 |
| KR | 20160095354 A | | 8/2016 |
| KR | 20190077835 A | | 7/2019 |
| KR | 20200076944 A | | 6/2020 |
| WO | 2020118431 A1 | | 6/2020 |

OTHER PUBLICATIONS

Extended European Search Report including Written Opinion for Application No. 21867182.4 dated Jun. 13, 2024, pp. 1-9.

* cited by examiner

ELECTRODE ASSEMBLY MANUFACTURING APPARATUS INCLUDING ULTRASONIC CUTTER AND METHOD USING THE SAME

CROSS-REFERENCE TO RELATED APPLICATIONS

The present application is a national phase entry under 35 U.S.C. § 371 of International Application No. PCT/KR2021/012408 filed on Sep. 13, 2021, and now published as International Publication No. WO 2022/055317 A1, which claims priority from Korean Patent Application No. 10-2020-0117858 filed on Sep. 14, 2020, all of which are hereby incorporated herein by reference in their entireties.

FIELD

The present invention relates to an electrode assembly manufacturing apparatus including an ultrasonic cutter and an electrode assembly manufacturing method including the same. More particularly, the present invention relates to an electrode assembly manufacturing apparatus including an ultrasonic cutter capable of cutting an electrode mixture coating portion as well as an electrode mixture non-coating portion in order to form an electrode tab at an electrode sheet and an electrode assembly manufacturing method including the same.

BACKGROUND

A secondary battery, which is capable of being repeatedly charged and discharged, has an advantage in that lifespan of a battery cell is long, and is used in a form in which the secondary battery is detachably attached to a device or is built in a device. The kinds of devices using the secondary battery as an energy source have increased.

In particular, a lithium secondary battery, which is charged and discharged as the result of movement of lithium ions, has been used not only in the field of a small-sized battery cell, which is used for mobile devices or small-sized electronic products, but also in the field of a medium- or large-sized battery pack, which is used as an energy source of an electric vehicle or a power storage system that requires high output and high voltage, since the lithium secondary battery has advantages of high energy density and high charge voltage.

Based on the shape of a battery case, the lithium secondary battery is classified as a cylindrical secondary battery having an electrode assembly mounted in a cylindrical metal can, a prismatic secondary battery having an electrode assembly mounted in a prismatic metal can, or a pouch-shaped secondary battery having an electrode assembly mounted in a pouch-shaped case made of an aluminum laminate sheet.

The electrode assembly is formed by stacking a positive electrode and a negative electrode such that a separator is interposed therebetween, and the positive electrode and the negative electrode are manufactured through a process of forming an electrode tab at each of a positive electrode sheet and a negative electrode sheet and a process of cutting each of the positive electrode sheet and the negative electrode sheet into a unit electrode.

Conventionally, a method of removing the remaining part of a non-coating portion of the electrode sheet excluding the electrode tab by punching is used to form the electrode tab. Specifically, a press cutter including an upper cutter and a lower cutter is placed on the electrode sheet, and the electrode sheet is notched by punching using the upper cutter to form the electrode tab. In the case in which the press cutter including the upper cutter and the lower cutter is used, however, the distance between the upper cutter and the lower cutter must be maintained at 0. As a result, much time is taken to maintain the press cutter. Furthermore, an electrode mixture layer may be easily cracked and the electrode mixture layer may be separated from the electrode sheet by pressure applied to the electrode sheet at the time of punching.

In addition, a burr may be generated on the cut section of an electrode sheet foil, or the cut section of the electrode sheet foil may be deformed, whereby quality of the cut section of the electrode sheet foil may be deteriorated.

In addition, since vibration is generated during a punching process using the press cutter, the electrode sheet having the electrode tab formed thereat by notching is wound in the form of a roll and the wound electrode sheet is conveyed to a lamination process line in order to perform a lamination process. Since the notching process and the lamination process must be separately performed, as described above, it is necessary to secure a wide space necessary for electrode assembly production facilities, and it is difficult to automate the entire process for manufacturing the electrode assembly.

In connection therewith, Patent Document 1 discloses an ultrasonic cutting device configured to cut a portion of a precursor of a secondary battery including a plurality of stacked power generation elements, each of which includes a positive electrode having a positive electrode protrusion for terminal connection, a separator, and a negative electrode having a negative electrode protrusion for terminal connection, e.g. a stack of the positive electrode protrusion and the negative electrode protrusion.

The ultrasonic cutting device of Patent Document 1 cuts the positive electrode protrusion and the negative electrode protrusion in the state in which the power generation elements are stacked. However, a method of cutting a positive electrode and a negative electrode from an electrode sheet is not provided, and the ultrasonic cutting device cuts only non-coating portions of the positive electrode and the negative electrode.

Therefore, there is a need for an electrode sheet cutter capable of preventing separation of an electrode mixture layer and deformation of an electrode sheet foil at the time of cutting an electrode mixture coating portion.

PRIOR ART DOCUMENT (Patent Document 1) Japanese Patent Application Publication No. 2018-094685 (2018 Jun. 21)

SUMMARY OF THE DISCLOSURE

The present invention has been made in view of the above problems, and it is an object of the present invention to provide an electrode assembly manufacturing apparatus capable of reducing a facility space necessary to manufacture an electrode assembly while preventing deformation of an electrode sheet foil and damage to an electrode mixture coating portion during a process of cutting an electrode sheet having a step formed due to the electrode mixture coating portion and an electrode assembly manufacturing method including the same.

In order to accomplish the above object, an electrode assembly manufacturing apparatus according to the present invention includes an electrode sheet supply unit configured to supply an electrode sheet having an electrode mixture coating portion and an electrode mixture non-coating portion formed thereon, a cutting unit disposed at the rear of the electrode sheet supply unit, the cutting unit being configured to form an electrode tab at the electrode sheet, and a lamination unit disposed at the rear of the electrode sheet supply unit, the lamination unit being configured to laminate a positive electrode and a negative electrode stacked such that a separator is interposed therebetween, wherein the cutting unit includes a die configured to support the electrode sheet and an ultrasonic cutter disposed spaced apart from the die, the ultrasonic cutter being configured to form the electrode tab, a cutting line of a cutting edge of the ultrasonic cutter is formed so as to correspond to an outer periphery of a unit electrode in a direction in which the electrode tab is formed, and the cutting unit and the lamination unit are disposed on the same process line such that a continuous process is performed.

In the electrode assembly manufacturing apparatus according to the present invention, the ultrasonic cutter may further include an auxiliary cutting edge configured to form a recess configured to guide unit electrode cutting.

The electrode assembly manufacturing apparatus according to the present invention may further include an electrode formation unit disposed between the cutting unit and the lamination unit, the electrode formation unit being configured to cut the electrode sheet in order to manufacture a unit electrode.

In the electrode assembly manufacturing apparatus according to the present invention, the cutting line of the cutting edge of the ultrasonic cutter may be formed so as to correspond to the outer periphery of the unit electrode.

In the electrode assembly manufacturing apparatus according to the present invention, the ultrasonic cutter may cut the electrode mixture coating portion.

In the electrode assembly manufacturing apparatus according to the present invention, the cutting line of the cutting edge of the ultrasonic cutter may be formed in a uniform plane.

In the electrode assembly manufacturing apparatus according to the present invention, an inspection member may be coupled to the ultrasonic cutter.

In addition, the present invention provides an electrode assembly manufacturing method using the electrode assembly manufacturing apparatus.

Specifically, the electrode assembly manufacturing method may include (a) conveying an electrode sheet to the cutting unit, (b) forming an electrode tab using the ultrasonic cutter, (c) cutting the electrode sheet into a unit electrode, and (d) laminating a positive electrode and a negative electrode with each other in the state in which a separator is interposed therebetween, wherein step (a) to step (d) may be performed on a continuous process line.

In the electrode assembly manufacturing method according to the present invention, step (b) and step (c) may be simultaneously performed.

In the electrode assembly manufacturing method according to the present invention, step (b) and step (c) may be sequentially performed, step (b) may be performed using a first ultrasonic cutter, and step (c) may be performed using a second ultrasonic cutter.

In the electrode assembly manufacturing method according to the present invention, the vibration direction of the ultrasonic cutter may be a direction perpendicular to the electrode sheet.

In the electrode assembly manufacturing method according to the present invention, step (b) may include a process of forming a recess configured to guide unit electrode cutting.

In the electrode assembly manufacturing method according to the present invention, step (b) may be performed through a process of pushing the cutting edge of the ultrasonic cutter once in the state in which the cutting edge of the ultrasonic cutter is placed on the outer surface of the electrode sheet to form the outer periphery of a unit electrode in the direction in which the electrode tab is formed.

As is apparent from the above description, in the present invention, an ultrasonic cutter is used to form an electrode tab, whereby it is possible to prevent deformation of an electrode sheet foil or separation of an electrode mixture layer in the cut section of an electrode mixture coating portion as well as an electrode mixture non-coating portion.

In addition, a cutting unit and a lamination unit configured to form an electrode tab are disposed on the same process line such that a continuous process can be performed, whereby it is possible to reduce space necessary for electrode assembly manufacturing facilities.

Also, in the case in which an inspection member is coupled to the ultrasonic cutter, it is possible to inspect the cut section of an electrode sheet having an electrode tab formed thereat simultaneously with formation of the electrode tab.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but rather means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Embodiments of the present invention will be described in detail with reference to the accompanying drawings.

Figure 1:
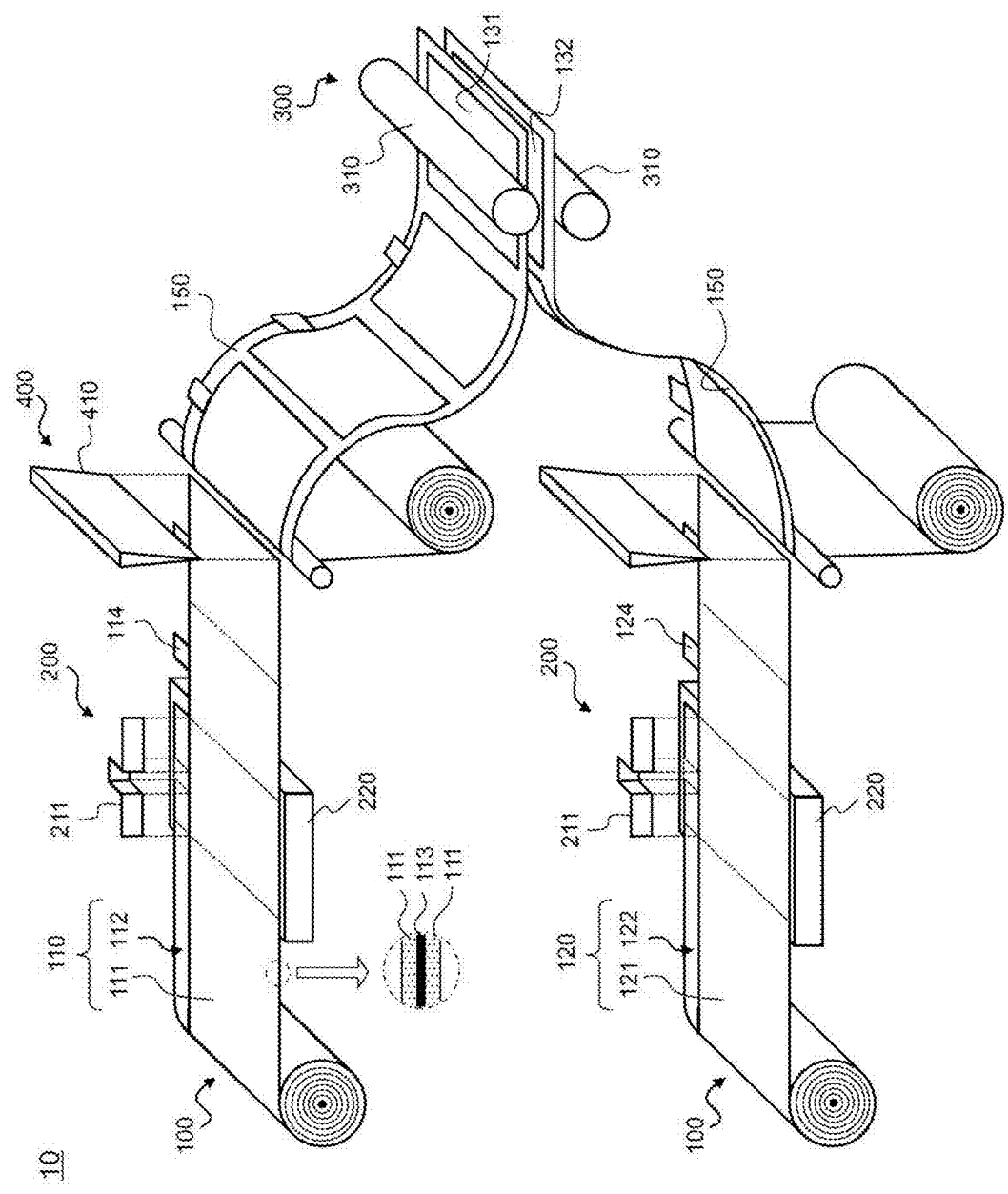
FIG. 1 is a perspective view of an electrode assembly manufacturing apparatus according to a first embodiment.
Figure 2:
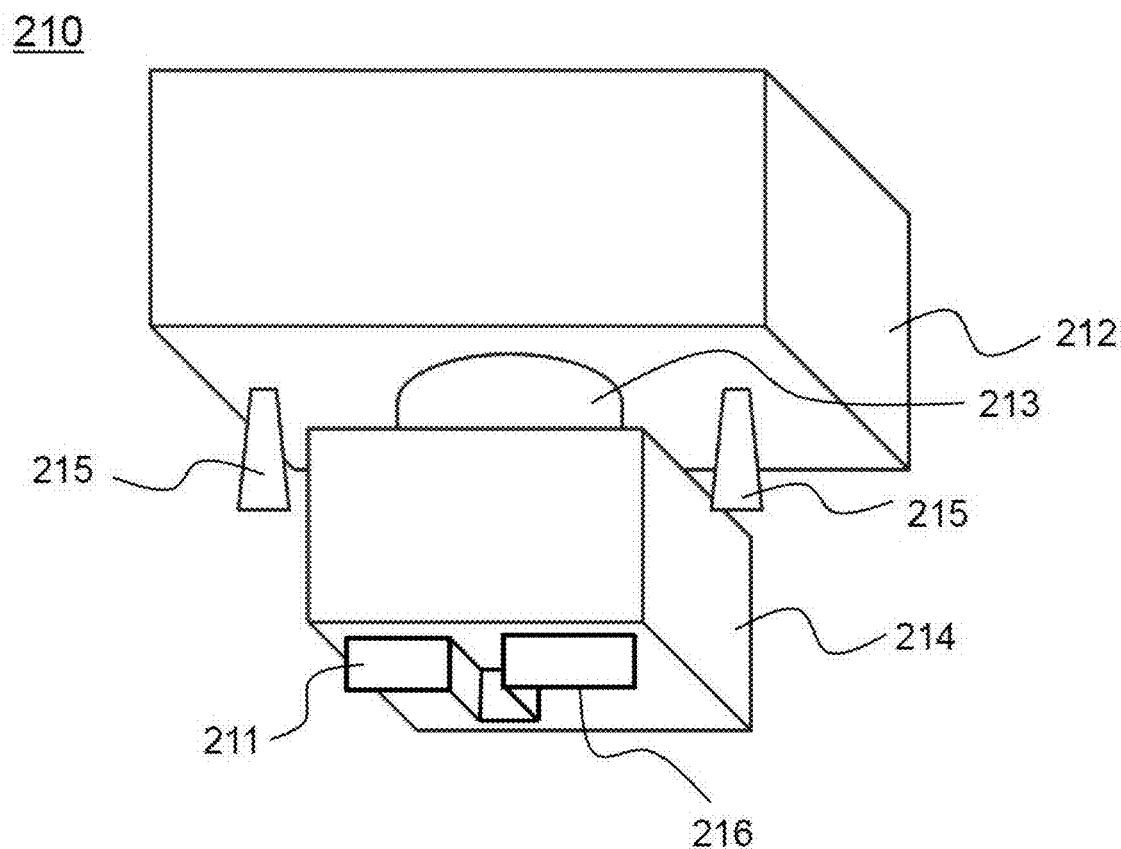
FIG. 2 is a perspective view of an ultrasonic cutter according to another embodiment.

FIG. 1 is a perspective view of an electrode assembly manufacturing apparatus according to a first embodiment, and FIG. 2 is a perspective view of an ultrasonic cutter according to another embodiment.

FIG. 1 shows a process of manufacturing a mono-cell configured to have a structure in which one positive electrode and one negative electrode are stacked in the state in which a separator is interposed therebetween.

Referring to FIGS. 1 and 2, the electrode assembly manufacturing apparatus 10 includes an electrode sheet supply unit 100 configured to supply an electrode sheet having an electrode mixture coating portion and an electrode mixture non-coating portion formed thereon; a cutting unit 200 configured to form an electrode tab at the electrode sheet; and a lamination unit 300 configured to laminate a positive electrode and a negative electrode stacked such that a separator is interposed therebetween.

The cutting unit 200 includes an ultrasonic cutter 210 and a die 220. An electrode tab is formed at an electrode sheet that moves above the die 220 using the ultrasonic cutter 210.

The ultrasonic cutter 210 shown in FIG. 2 includes an oscillator 212 configured to generate ultrasonic waves, a booster 213 configured to amplify/reduce vibration energy generated by the oscillator 212, a cutting edge 211 configured to cut an electrode sheet, and a horn 214 configured to transmit the vibration energy from the booster 213 to the cutting edge 211.

In a concrete example, the cutting speed of the ultrasonic cutter 210 may be set to 200 m/s or less. The ultrasonic waves of the ultrasonic cutter may have an oscillation frequency of 15 kHz to 40 kHz and an amplitude of 10 µm to 60 µm, which may be changed depending on the construction of the electrode sheet.

As described above, the ultrasonic cutter is used to form an electrode tab, and therefore damage to an electrode sheet due to vibration is less than in a conventional process of notching an electrode tab by punching using a press cutter.

Also, in the case in which a conventional cutting unit cuts an electrode sheet using the press cutter, the distance between an upper cutter and a lower cutter must be maintained at 0, and therefore a micro-adjustment process for maintaining the distance between the upper cutter and the lower cutter is necessary. In the present disclosure, however, an electrode tab is formed by pushing the cutting edge of the ultrasonic cutter in the state in which the cutting edge is placed on the outer surface of the electrode sheet, and therefore a process of maintaining the distance between the upper cutter and the lower cutter is unnecessary, unlike the conventional art. Consequently, it is possible to save time necessary to maintain the distance between the upper cutter and the lower cutter in the conventional art.

Meanwhile, vibration generated during the notching process using the press cutter is great in the conventional art. If the notching process and a lamination process of aligning and laminating a positive electrode and a negative electrode are performed on the same process line, therefore, vibration generated during the notching process may affect the lamination process. In the conventional art, therefore, a notching process line and a lamination process line are separately provided. Specifically, an electrode assembly is manufactured using a method of winding an electrode sheet that has undergone the notching process in the form of a roll, conveying the wound electrode sheet to the lamination process line, and performing the lamination process. Consequently, the notching process and the lamination process are discontinuously performed.

However, the ultrasonic cutter, which generates little vibration, is used during a process of forming an electrode tab. Even though the cutting unit and the lamination unit are disposed on the same process line, therefore, vibration from the cutting unit hardly affects the lamination unit. Therefore, the cutting unit and the lamination unit are disposed on the same process line, whereby the electrode tab formation process and the lamination process may be continuously performed.

Consequently, a facility space necessary to manufacture an electrode assembly may be reduced. In addition, since time for conveying an electrode roll is unnecessary, it is possible to reduce time necessary to manufacture the electrode assembly and to automate the notching process and the lamination process.

For example, in the case in which the notching process and the lamination process are continuously performed on the same process line, it is possible to reduce about 5% to 50% of time necessary when the notching process and the lamination process are discontinuously performed.

In a concrete example, an inspection member 215 is attached to the ultrasonic cutter 210 of FIG. 2 so as to face in a direction parallel to the cutting edge 211. A vision camera may be used as the inspection member 215.

In the case in which the press cutter is used in the conventional art, it is difficult to provide the inspection member at the press cutter due to impact generated during a cutting process. However, the present disclosure proposes a structure in which the inspection member is attached to the ultrasonic cutter, whereby it is possible to determine whether the shape of an electrode tab is normal simultaneously with cutting of an electrode sheet. Consequently, an electrode assembly manufacturing process may be shortened, whereby productivity may be improved.

The electrode sheet supply unit 100 of FIG. 1 includes a positive electrode sheet supply unit configured to supply a positive electrode sheet 110 and a negative electrode sheet supply unit configured to supply a negative electrode sheet 120.

The positive electrode sheet 110 is provided with a positive electrode mixture coating portion 111, in which opposite surfaces of a positive electrode sheet foil 113 are coated with a positive electrode mixture, and a positive electrode mixture non-coating portion 112, in which no positive electrode mixture is formed on the opposite surfaces of the positive electrode sheet foil by coating. That is, the positive electrode mixture non-coating portion 112 is an exposed portion of the positive electrode sheet foil 113.

The description of the positive electrode sheet 110 having the positive electrode mixture coating portion 111 and the positive electrode mixture non-coating portion 112, in which no positive electrode mixture is formed by coating, is equally applied to a negative electrode sheet 120 having a negative electrode mixture coating portion 121 and a negative electrode mixture non-coating portion 122, in which no negative electrode mixture is formed by coating.

Referring to FIGS. 1 and 2, a cutting line 216 of the cutting edge 211 of the ultrasonic cutter 210 of FIG. 2 is formed so as to correspond to the outer periphery of a unit electrode in a direction in which an electrode tab is formed.

When the cutting edge 211 of the ultrasonic cutter is disposed at a position at which an electrode tab is to be formed and an electrode sheet is pressed using the ultrasonic cutter, therefore, the remaining part of the positive electrode mixture non-coating portion 112 excluding a positive electrode tab 114 is cut along the shape of the cutting line 216, whereby the positive electrode tab 114 is formed, and the remaining part of the negative electrode mixture non-coating portion 122 excluding a negative electrode tab 124 is cut along the shape of the cutting line 216, whereby the negative electrode tab 124 is formed.

An electrode formation unit 400, which is configured to cut the positive electrode sheet having the positive electrode tab 114 formed thereat in order to manufacture a unit positive electrode and which is configured to cut the negative electrode sheet having the negative electrode tab 124 formed thereat in order to manufacture a unit negative electrode, is located at the rear of the cutting unit 200. That is, the electrode formation unit 400 is disposed between the cutting unit 200 and the lamination unit 300.

The unit positive electrode and the unit negative electrode mean a single positive electrode and a single negative electrode manufactured by cutting the positive electrode sheet and the negative electrode sheet at predetermined intervals. In this specification, the positive electrode is used as a meaning including the unit positive electrode, and the negative electrode is used as a meaning including the unit negative electrode.

In the electrode formation unit 400, a cutter 410 configured to cut the electrode sheet may be a press cutter including an upper cutter and a lower cutter, or an ultrasonic cutter may be used.

In the case in which the ultrasonic cutter is used, it is possible to cut the electrode sheet such that damage to the electrode mixture layer and the electrode sheet foil is minimized.

The unit positive electrodes and the unit negative electrodes cut by the electrode formation unit are conveyed to the lamination unit 300 in a state of being attached to a separator 150 so as to be spaced apart from each other by a predetermined distance. A positive electrode 131 attached to the separator 150 and a negative electrode 132 attached to the separator 150 are laminated with each other while passing between a pair of rollers 310 included in the lamination unit 300. Subsequently, a separator cutting process is performed, whereby a mono-cell having a structure in which the positive electrode, the separator, the negative electrode, and the separator are sequentially stacked is manufactured.

In a concrete example, an electrode assembly manufacturing method may include (a) a step of conveying an electrode sheet to the cutting unit, (b) a step of forming an electrode tab using the ultrasonic cutter, (c) a step of cutting the electrode sheet into a unit electrode, and (d) a step of laminating a positive electrode and a negative electrode with each other in the state in which a separator is interposed therebetween, wherein step (a) to step (d) may be performed on a continuous process line.

As shown in FIG. 1, step (b) performed at the cutting unit 200 and step (c) performed at the electrode formation unit 400 may be sequentially performed. In step (b), the ultrasonic cutter 210 may be used as a first ultrasonic cutter. In step (c), the cutter 410 may be used as a second ultrasonic cutter.

The vibration direction of the ultrasonic cutter 210 is a direction perpendicular to the positive electrode sheet 110 and the negative electrode sheet 120. Consequently, the ultrasonic cutter 210 is moved in a direction perpendicular to the positive electrode sheet and the negative electrode sheet such that the movement direction of the ultrasonic cutter is identical to the vibration direction of the ultrasonic cutter.

Figure 3:
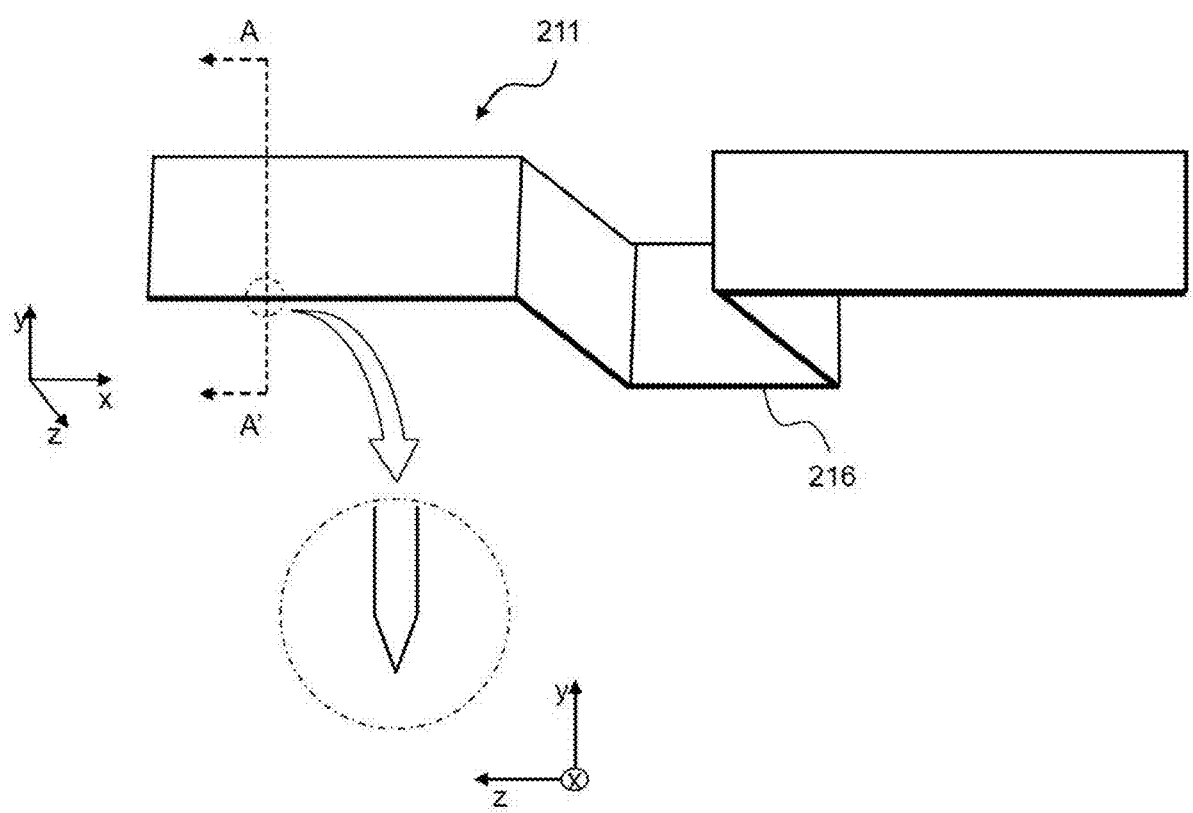
FIG. 3 is an enlarged view of a cutting edge of the ultrasonic cutter of FIG. 2.

In connection therewith, FIG. 3 is an enlarged view of the cutting edge of the ultrasonic cutter.

Referring to FIG. 3, the cutting line 216 of the cutting edge 211 of the ultrasonic cutter is bent so as to correspond in shape to the outer periphery of a unit electrode at which an electrode tab is formed.

Referring to an enlarged sectional view of the cutting edge taken along line A-A', the end of the section of the cutting edge is formed in a V shape. Consequently, the cutting edge must be moved in a state of being perpendicular to the electrode sheet such that the electrode sheet is cut by the end of the cutting edge. In this case, contact between the cutting edge and the electrode sheet may be minimized, whereby friction therebetween may be minimized. If the cutting edge is moved in a state of being inclined relative to the electrode sheet, not perpendicular to the electrode sheet, in order to cut the electrode sheet, the electrode sheet may be burned due to friction generated as the result of contact between the V-shaped inclined surface of the end of the cutting edge and the electrode sheet.

Meanwhile, the cutting line of the cutting edge of the ultrasonic cutter is formed in a uniform plane. That is, the length of the cutting edge in a y-axis direction is uniform over the entirety thereof.

Figure 4:
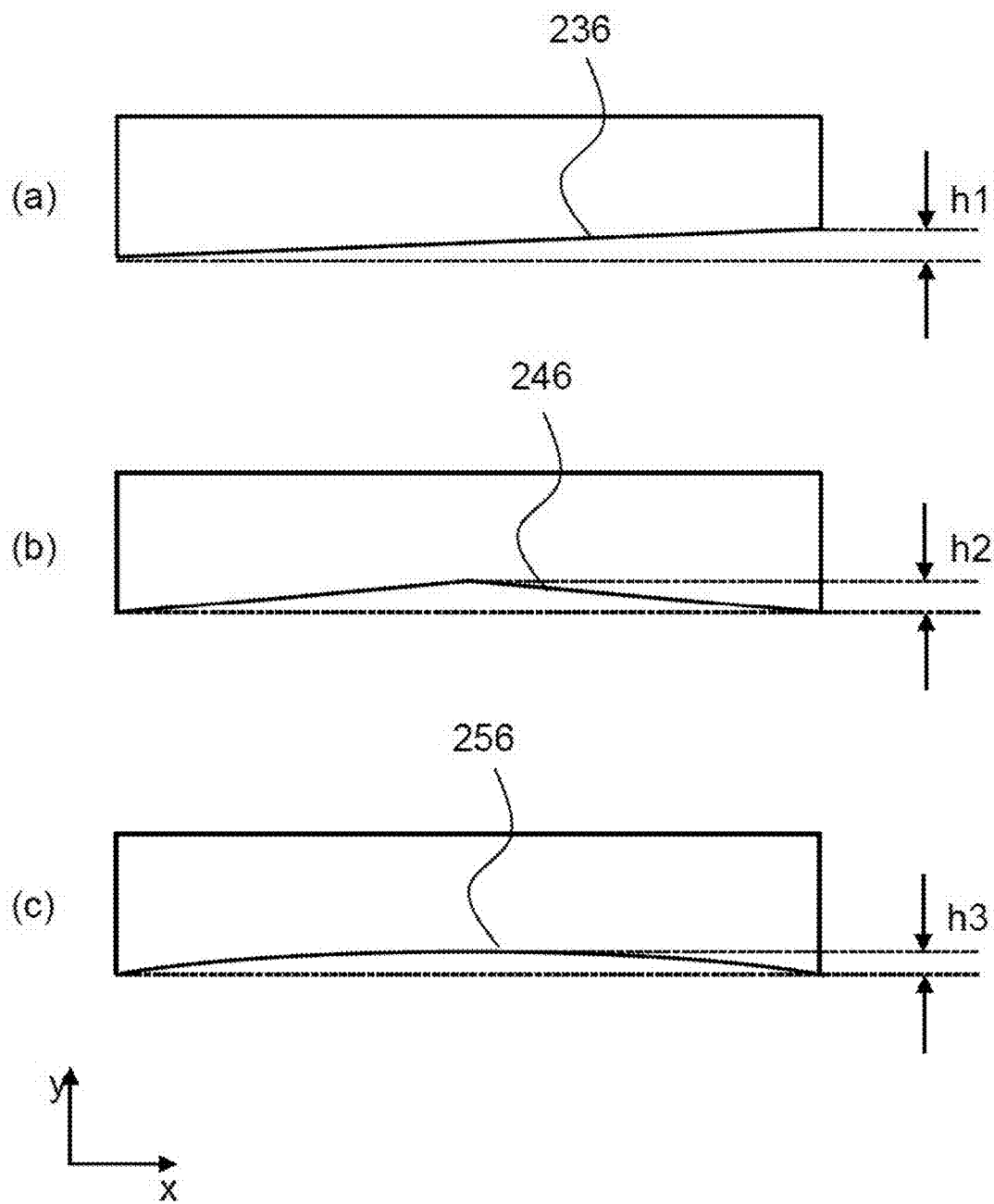
FIG. 4 is a plan view showing various shapes of the cutting edge for the ultrasonic cutter of FIG. 2.

In connection therewith, FIG. 4 is a plan view showing various shapes of the cutting edge.

Referring to (a) to (c) of FIG. 4, the length of the cutting edge in the y-axis direction is not uniform. That is, cutting lines 236, 246, and 256 of the cutting edge are not formed in a uniform plane.

In the case in which an electrode sheet is cut using the press cutter including the upper cutter and the lower cutter in the conventional art, the cutting edge having any of the above-mentioned shapes is used in order to increase cutting force. When the electrode sheet is cut using the cutting edges shown in (a) to (c) of FIG. 4, however, the cutting edges must be further moved by h1, h2, and h3 in the y-axis direction.

In contrast, the movement distance of the cutting edge used in the present disclosure in the y-axis direction is reduced by h1, h2, and h3, compared to the cutting edges shown in FIG. 4, and therefore it is possible to reduce time necessary to form the electrode tab, compared to the case in which the conventional press cutter is used.

Figure 5:
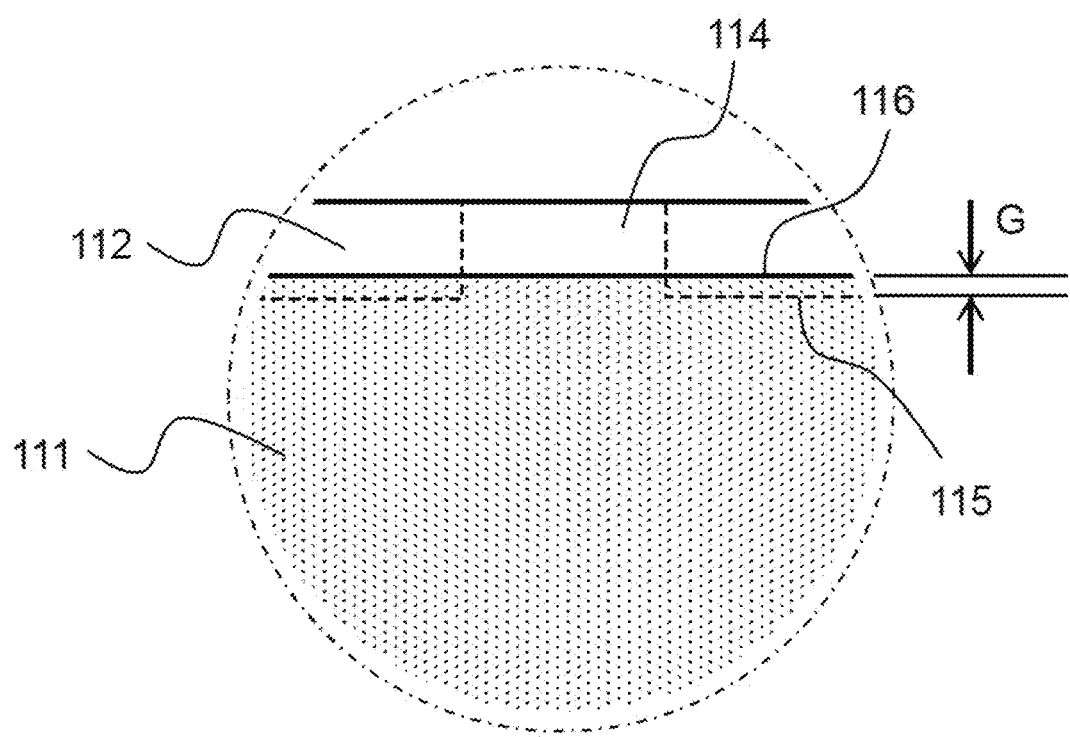
FIG. 5 is a partial enlarged view showing a portion of a positive electrode sheet at which a positive electrode tab is formed.

FIG. 5 is a partial enlarged view showing the portion of the positive electrode sheet at which the positive electrode tab is formed.

Referring to FIG. 5, the positive electrode sheet is cut such that an outer periphery 115 of the positive electrode is formed at the part of the positive electrode shifted toward the positive electrode mixture coating portion 111 by G based on a border line 116 between the positive electrode mixture coating portion 111 and the positive electrode mixture non-coating portion 112.

That is, the ultrasonic cutter cuts not only the positive electrode mixture non-coating portion 112, at which the positive electrode tab 114 is formed, but also the positive electrode mixture coating portion 111.

Figure 6:
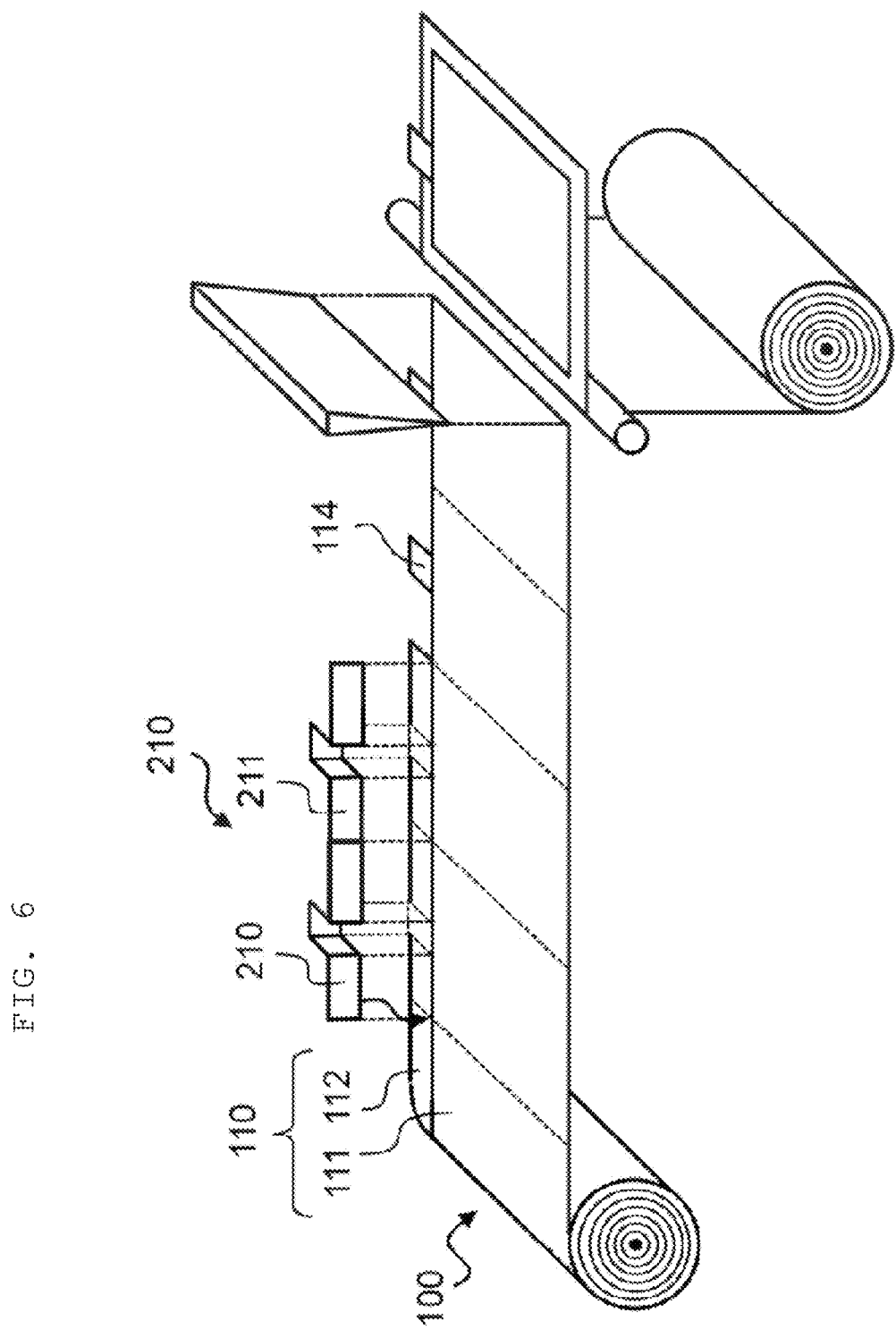
FIG. 6 is a perspective view of a portion of an electrode assembly manufacturing apparatus according to a second embodiment.

FIG. 6 is a perspective view of a portion of an electrode assembly manufacturing apparatus according to a second embodiment.

Referring to FIG. 6, a positive electrode sheet 110 supplied from an electrode sheet supply unit 100 is provided with a positive electrode mixture coating portion 111 and a positive electrode mixture non-coating portion 112, and a positive electrode tab 114 is formed at the positive electrode mixture non-coating portion 112 and a border between the positive electrode mixture coating portion 111 and the positive electrode mixture non-coating portion 112.

Two cutting edges 211 of an ultrasonic cutter 210 are continuously disposed, which is different from FIG. 1. The speed at which the positive electrode tab is formed may be increased in proportion to extension of the cutting edge 211.

Figure 7:
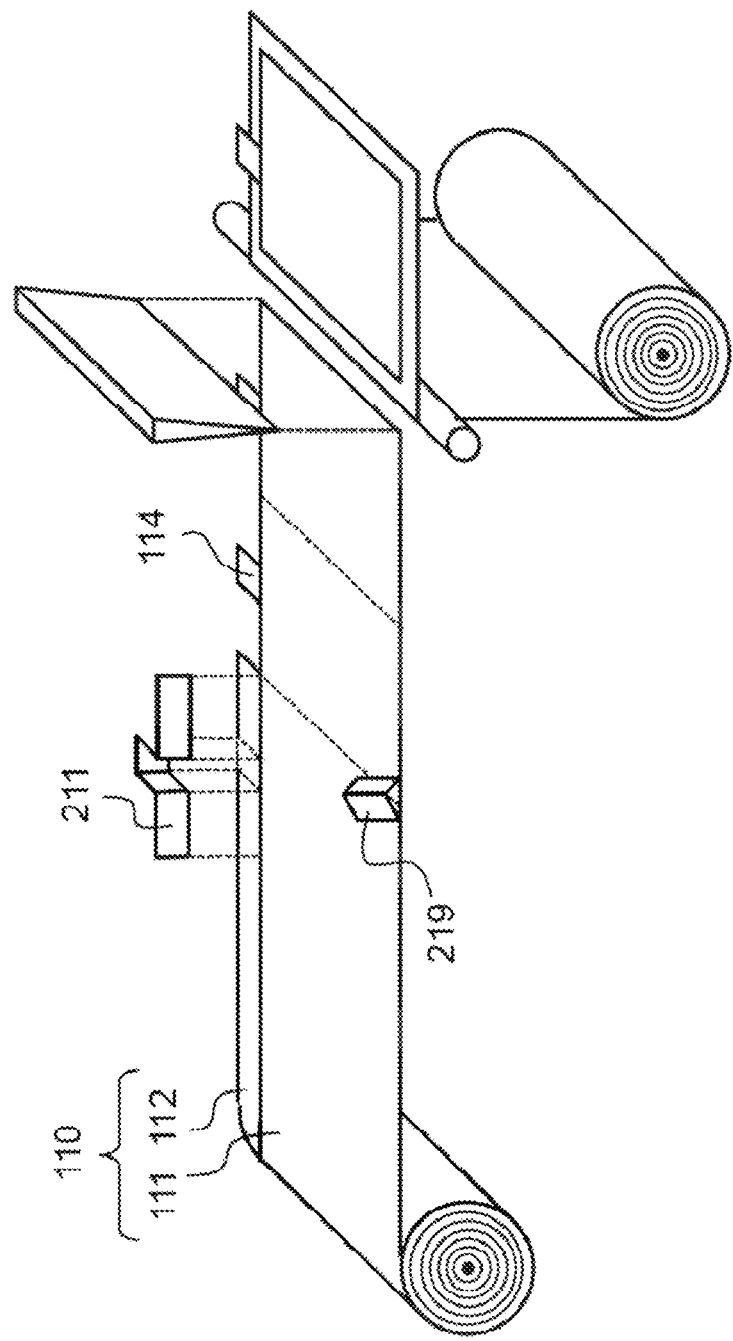
FIG. 7 is a perspective view of a portion of an electrode assembly manufacturing apparatus according to a third embodiment.

FIG. 7 is a perspective view of a portion of an electrode assembly manufacturing apparatus according to a third embodiment.

Referring to FIG. 7, the ultrasonic cutter further includes an auxiliary cutting edge 219, when compared to FIG. 1. The auxiliary cutting edge 219 is provided to form a recess configured to guide unit electrode cutting. A recess configured to indicate the position at which the electrode sheet is cut in order to manufacture a unit electrode may be formed.

The recess may be formed so as to have a slit shape or a shape in which the size of the recess is gradually increased from the inside to the outside of the electrode sheet, although the shape of the recess is not particularly restricted. Specifically, a V-shaped recess may be formed.

Consequently, cutting for forming an electrode tab and cutting for forming a recess configured to guide unit electrode cutting may be simultaneously performed, whereby the manufacturing process may be shortened.

Figure 8:
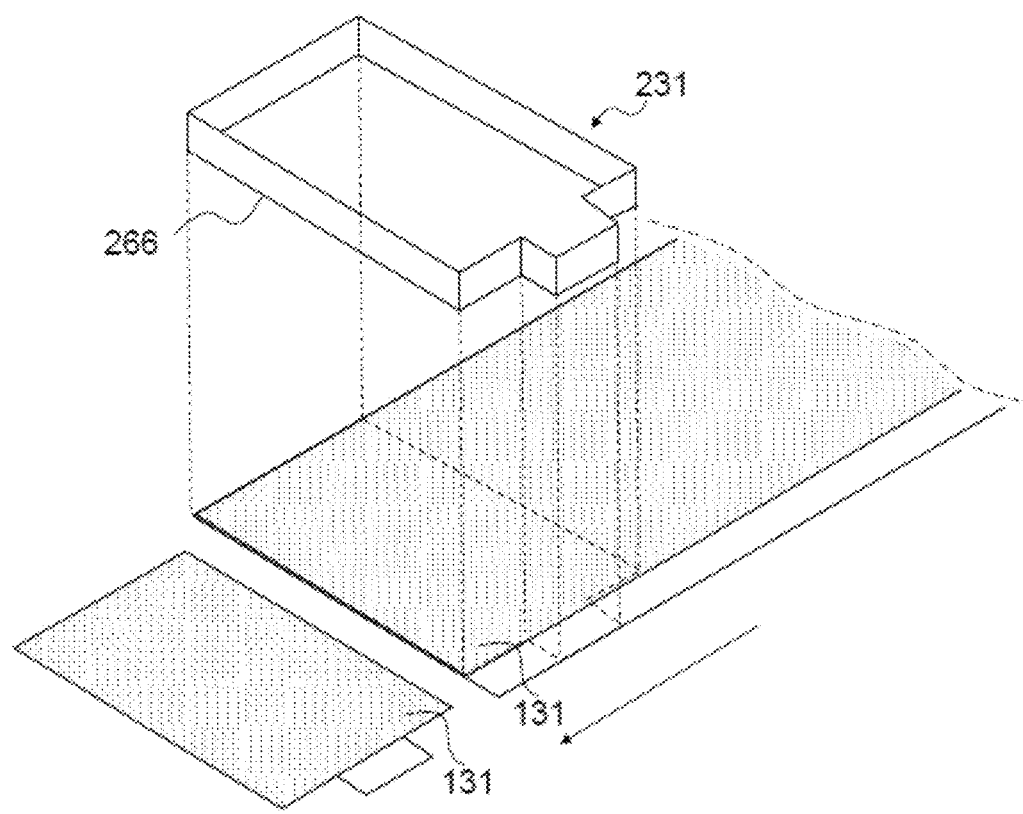
FIG. 8 is a perspective view showing a cutting edge in an electrode assembly manufacturing apparatus according to a fourth embodiment.

FIG. 8 is a perspective view showing a cutting edge in an electrode assembly manufacturing apparatus according to a fourth embodiment.

Referring to FIG. 8, a cutting line 266 of the cutting edge 231 is formed in a shape corresponding to the outer periphery of a positive electrode 131.

When the cutting edge of FIG. 8 is used, a step of forming an electrode tab using an ultrasonic cutter and a step of cutting an electrode sheet into a unit electrode may be simultaneously performed. Consequently, it is possible to separate a positive electrode 131 having a positive electrode tab formed thereat from a positive electrode sheet by pressing the electrode sheet once. The electrode formation unit of FIG. 1 is not separately necessary.

Consequently, it is possible to simplify the electrode assembly manufacturing process and to reduce manufacturing time.

In order to determine whether an electrode sheet is damaged in the case in which the electrode assembly manufacturing apparatus according to the present disclosure is used, an electrode obtained by cutting the electrode sheet using the ultrasonic cutter and an electrode obtained by cutting the electrode sheet using the press cutter are compared with each other as follows.

Figure 9:
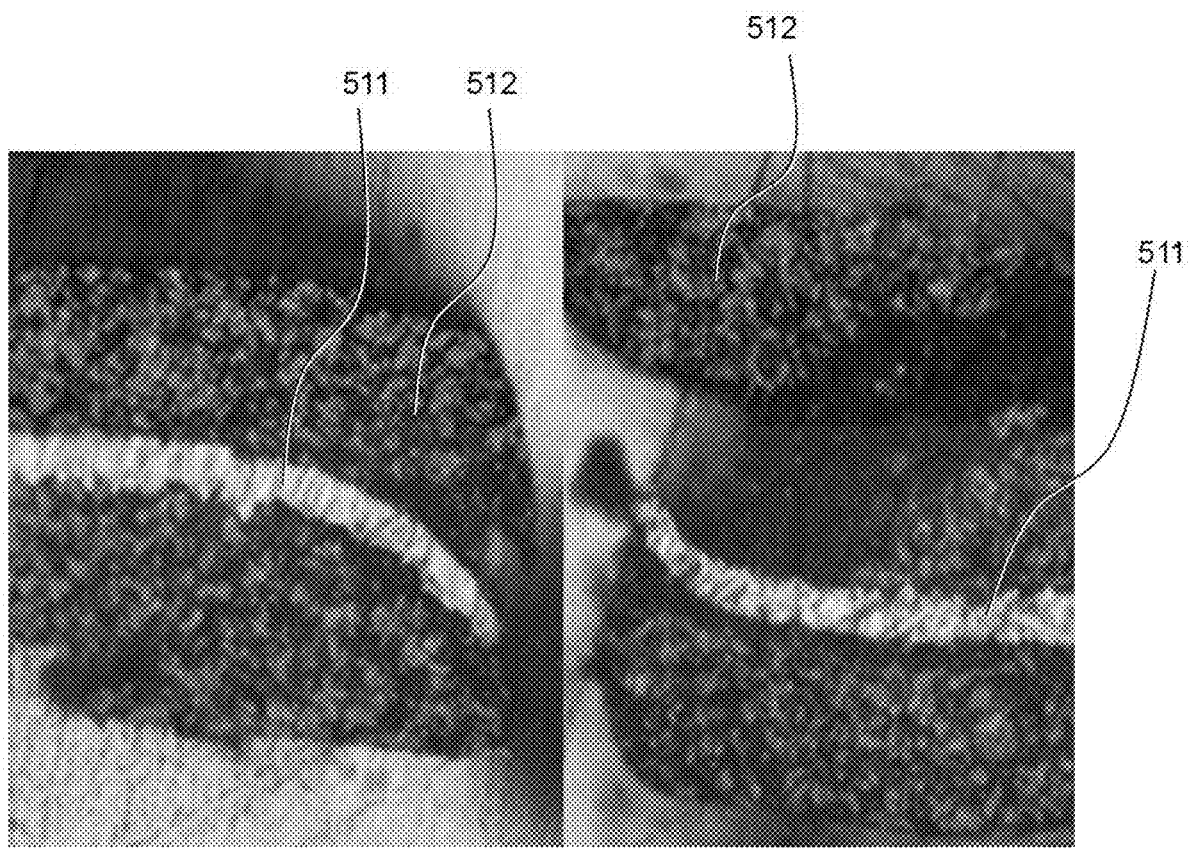
FIG. 9 is an enlarged view of the cut section of an electrode sheet cut using a press cutter according to the prior art.
Figure 10:
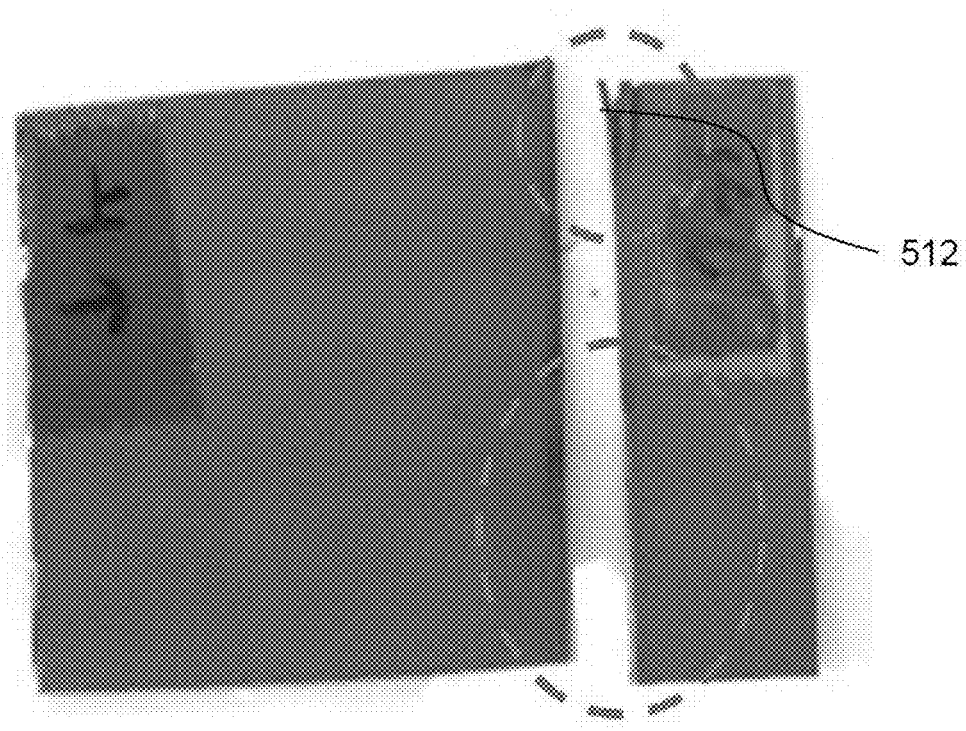
FIG. 10 is a plan view of the electrode sheet of FIG. 9 cut using the press cutter according to the prior art.
Figure 10:
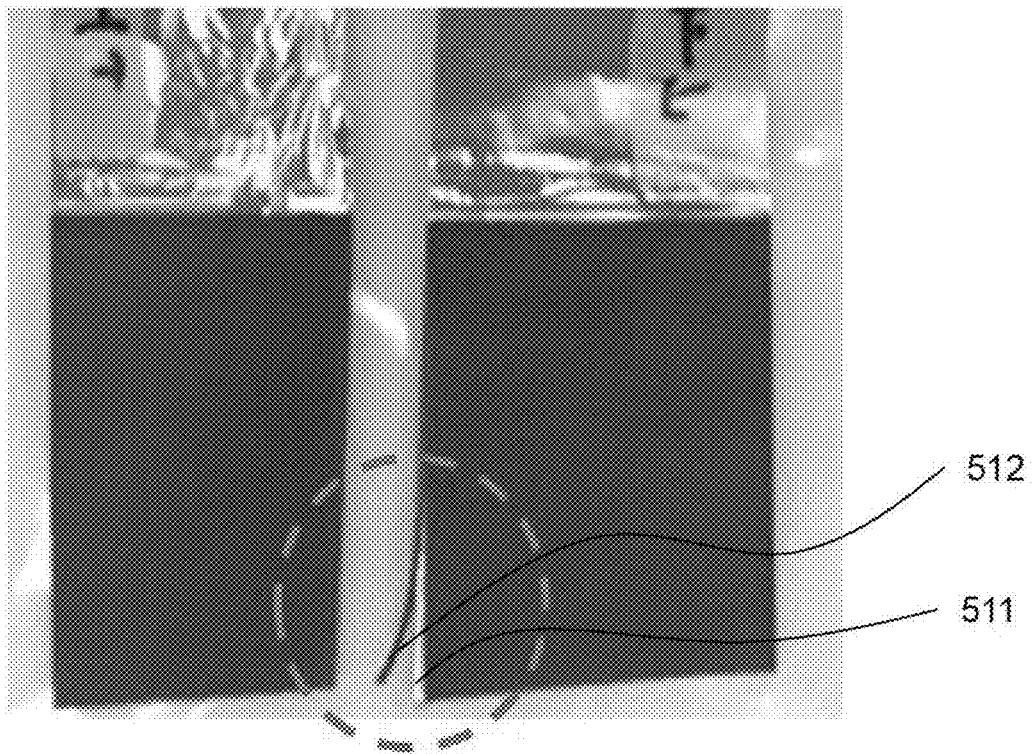
Figure 11:
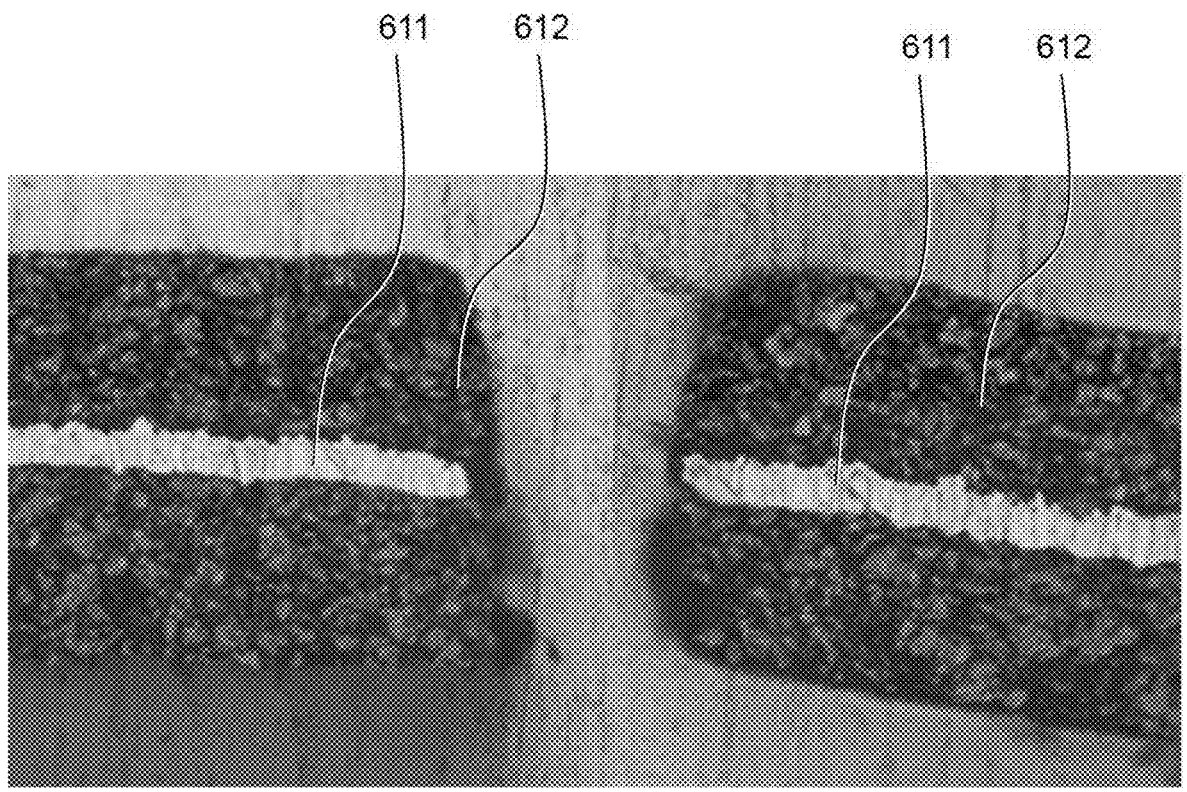
FIG. 11 is an enlarged view of the cut section of an electrode sheet cut using an ultrasonic cutter according to an embodiment.

FIG. 9 is an enlarged view of the cut section of an electrode sheet cut using the press cutter, and FIG. 10 is a plan view of the electrode sheet cut using the press cutter. FIG. 11 is an enlarged view of the cut section of an electrode sheet cut using the ultrasonic cutter, and FIG. 12 is a plan view of the electrode sheet cut using the ultrasonic cutter.

Referring to FIGS. 9 and 10, it can be seen from the cut section of the electrode sheet cut using the press cutter shown in FIG. 9 that an electrode sheet foil 511 was bent and an electrode mixture layer 512 was separated from the electrode sheet foil 511. In addition, it can be seen from a portion indicated by a dotted line in FIG. 10 that the electrode mixture layer 512 was separated from the electrode sheet foil 511.

Figure 12:
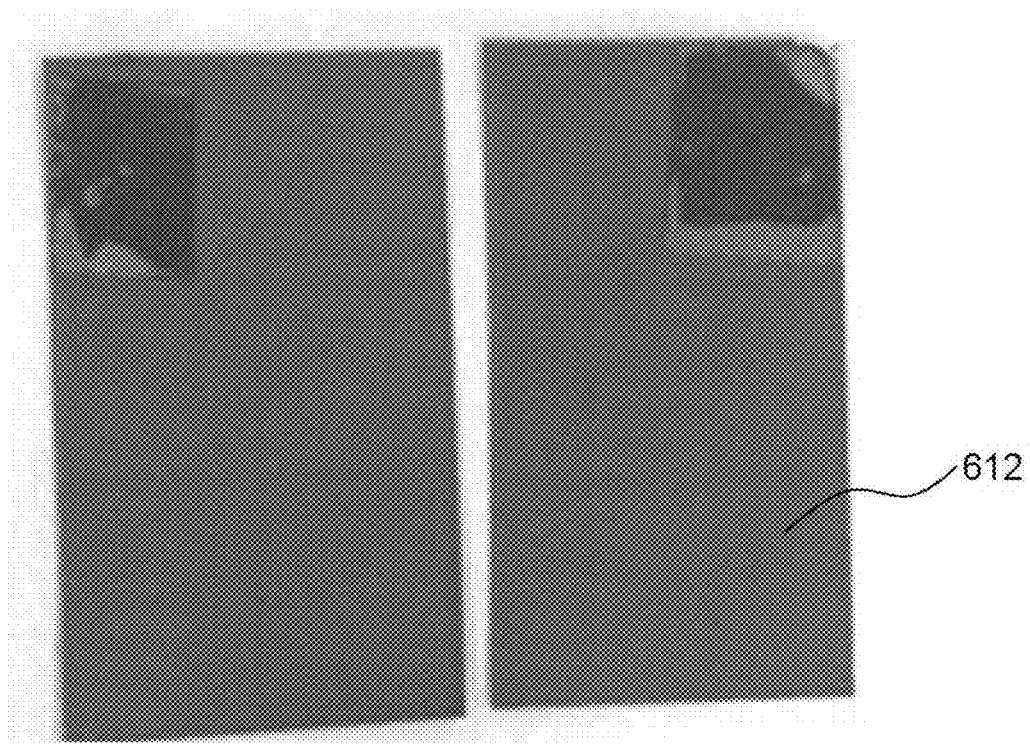
FIG. 12 is a plan view of the electrode sheet of FIG. 11 cut using the ultrasonic cutter.
Figure 12:
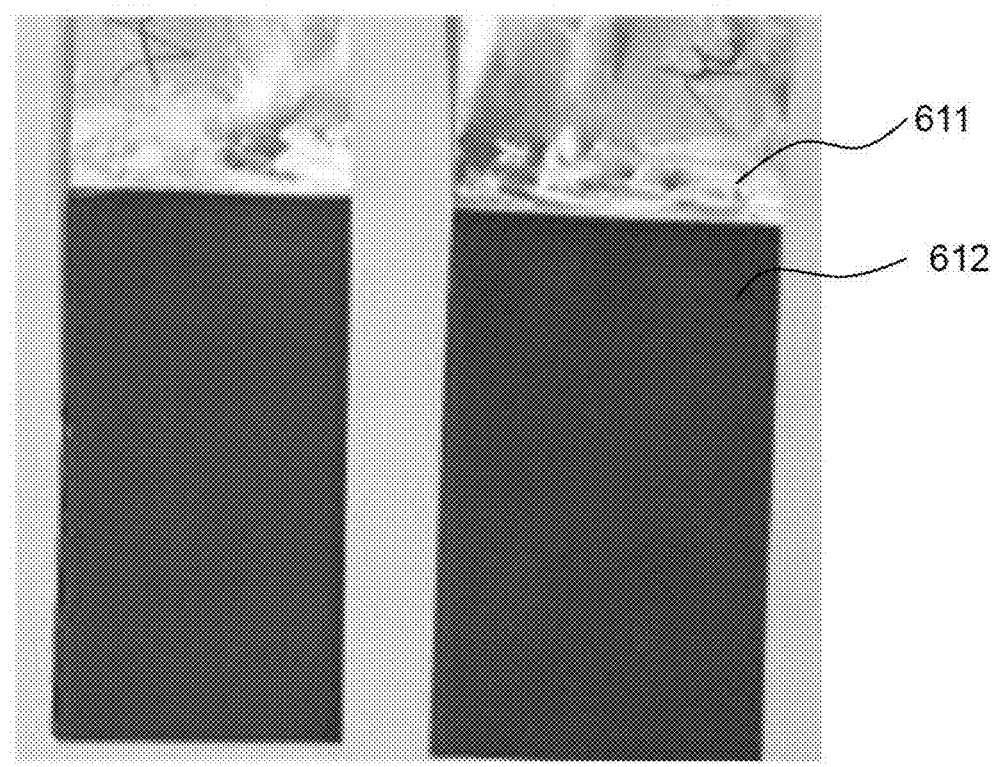

Referring to FIGS. 11 and 12 using the ultrasonic cutter, it can be seen that both of an electrode sheet foil 611 and an electrode mixture layer 612 were not deformed at the cut section of the electrode sheet and that the electrode mixture layer 612 was normally attached to the electrode sheet foil 611.

Figure 13:
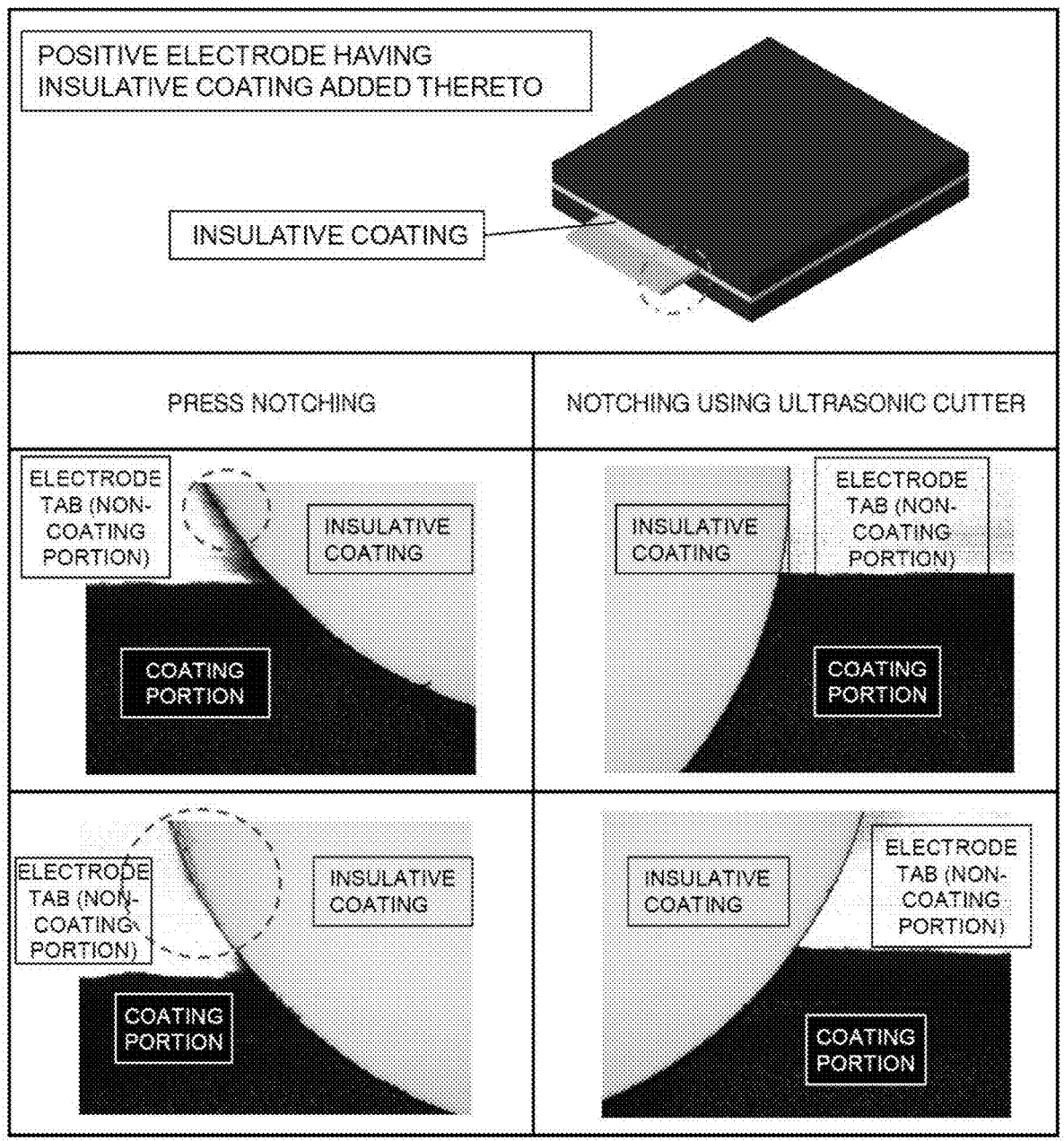
FIG. 13 is a chart showing a comparison between sections of a positive electrode sheet having an insulative coating added thereto notched using a press and the ultrasonic cutter.

FIG. 13 is a view showing comparison between sections of a positive electrode sheet having an insulative coating added thereto notched using a press and the ultrasonic cutter.

Referring to FIG. 13, it can be seen that the insulative coating was separated from the positive electrode notched using the press, as shown in a circle indicated by a dotted line. However, it can be seen that the positive electrode notched using the ultrasonic cutter had a neat external appearance without separation of the insulative coating layer and that a smooth border line of the positive electrode mixture layer was maintained, i.e. the positive electrode mixture layer was stably attached to the positive electrode sheet foil.

Figure 14:
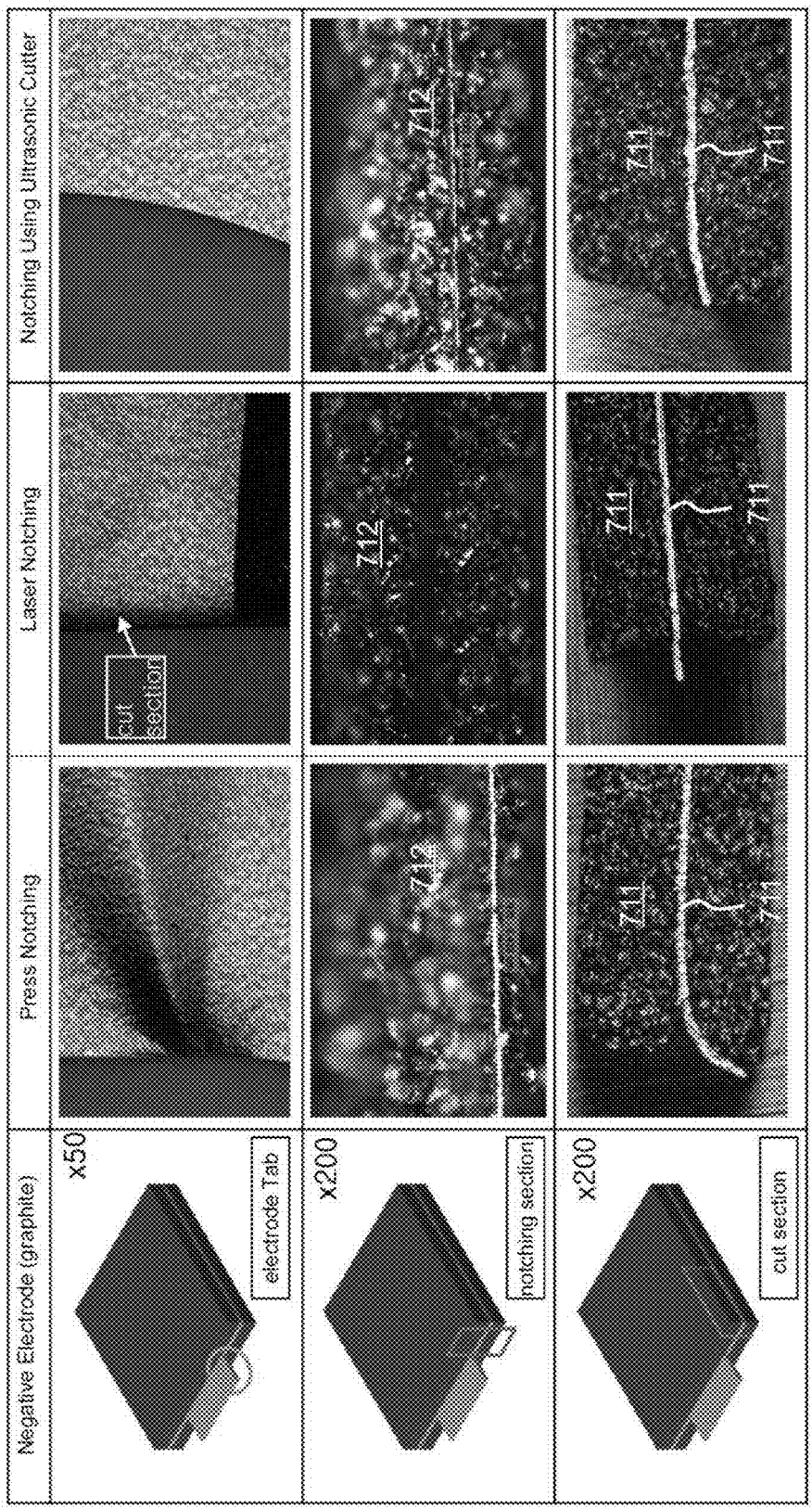
FIG. 14 is a table showing comparisons between sections of a negative electrode sheet notched using the press, the ultrasonic cutter, and a laser.

FIG. 14 is a view showing comparison between sections of a negative electrode sheet notched using the press, the ultrasonic cutter, and a laser.

Referring to FIG. 14, it can be seen that, when press notching was performed, an electrode tab was bent and a burr was generated on an electrode sheet foil 711 in the cut section of the positive electrode sheet. It can be seen that, when laser notching was performed, an electrode mixture layer 712 in the cut section of an electrode tab and the notching section were thermally deformed by heat from the laser. It can be seen that, when notching was performed using the ultrasonic cutter, the electrode sheet foil 711 and the electrode mixture layer 712 were not damaged in both the electrode tab and the notching section, the electrode sheet foil 711 was not bent even in the cut section, and the electrode mixture layer 712 was normally attached to the electrode sheet foil 711.

In the case in which the ultrasonic cutter is used, as described above, the electrode mixture layer may remain stably attached to the electrode sheet foil, and generation of a burr on the cut section of the electrode sheet foil or the deformation of the cut section of the electrode sheet foil may be minimized.

Those skilled in the art to which the present invention pertains will appreciate that various applications and modifications are possible within the category of the present invention based on the above description.

DESCRIPTION OF REFERENCE NUMERALS

10: Electrode assembly manufacturing apparatus
100: Electrode sheet supply unit
110: Positive electrode sheet
111: Positive electrode mixture coating portion
112: Positive electrode mixture non-coating portion
113: Positive electrode sheet foil
114: Positive electrode tab
115: Outer periphery of positive electrode
116: Border line
120: Negative electrode sheet
121: Negative electrode mixture coating portion
122: Negative electrode mixture non-coating portion
124: Negative electrode tab
131: Positive electrode
132: Negative electrode
150: Separator
200: Cutting unit
210: Ultrasonic cutter
211, 231: Cutting edges
212: Oscillator
213: Booster
214: Horn
215: Inspection member
216, 236, 246, 256, 266: Cutting lines
219: Auxiliary cutting edge
220: Die
300: Lamination unit
310: Roller
400: Electrode formation unit
410: Cutter
511, 611, 711: Electrode sheet foils
512, 612, 712: Electrode mixture layers As is apparent from the above description, in the present invention, an ultrasonic cutter is used to form an electrode tab, whereby it is possible to prevent deformation of an electrode sheet foil or separation of an electrode mixture layer in the cut section of an electrode mixture coating portion as well as an electrode mixture non-coating portion.

In addition, a cutting unit and a lamination unit configured to form an electrode tab are disposed on the same process line such that a continuous process can be performed, whereby it is possible to reduce space necessary for electrode assembly manufacturing facilities.

Also, in the case in which an inspection member is coupled to the ultrasonic cutter, it is possible to inspect the cut section of an electrode sheet having an electrode tab formed thereat simultaneously with formation of the electrode tab.

The invention claimed is:

1. An electrode assembly manufacturing apparatus comprising:
  positive and negative electrode sheet supply units configured to supply positive and negative electrode sheets, respectively;
  positive and negative cutting units each disposed at a rear of the respective positive and negative electrode sheet supply units;
  a lamination unit disposed at a rear of the electrode sheet supply units, the lamination unit being configured to laminate a positive electrode from the positive cutting unit and a negative electrode from the negative cutting unit stacked with a separator between the positive and the negative electrodes; and
  positive and negative electrode formation units disposed between the respective positive and negative cutting units and the lamination unit, each electrode formation unit being configured to cut the respective positive or negative electrode sheet to manufacture a unit electrode,
  wherein each cutting unit comprises a die having a planar support surface configured to support the respective electrode sheet and an ultrasonic cutter spaced apart from the die, the ultrasonic cutter having a planar cutting surface configured to form an electrode tab,
  wherein each ultrasonic cutter includes a cutting edge configured to cut the respective electrode sheet to form an outer periphery of the unit electrode while forming the electrode tab,
  wherein each ultrasonic cutter further comprises an auxiliary cutting edge configured to form a recess configured to guide a cutting of the electrode sheet into the unit electrode, and
  the positive and negative cutting units and the lamination unit are disposed on a same continuous process line.

2. The electrode assembly manufacturing apparatus according to claim 1, wherein a cutting line of the cutting edge of the ultrasonic cutter is formed so as to correspond to the outer periphery of the unit electrode.

3. The electrode assembly manufacturing apparatus according to claim 1,
  wherein the electrode sheet has an electrode mixture coating portion and an electrode mixture non-coating portion formed on the electrode sheet, and
  wherein the ultrasonic cutter is configured to cut the electrode mixture coating portion.

4. The electrode assembly manufacturing apparatus according to claim 1, wherein the cutting edge of the ultrasonic cutter defines a plane.

5. The electrode assembly manufacturing apparatus according to claim 1, further comprising an inspection member coupled to the ultrasonic cutter.

6. The electrode assembly manufacturing apparatus according to claim 1, wherein the unit electrode contacts the separator so as to be laminated with the separator by the lamination unit within the continuous process line.

7. An electrode assembly manufacturing method using the electrode assembly manufacturing apparatus according to claim 1, the electrode assembly manufacturing method comprising:
  (a) conveying an electrode sheet to the cutting unit;
  (b) forming the electrode tab using the ultrasonic cutter;
  (c) cutting the electrode sheet into a positive electrode or a negative electrode; and
  (d) laminating the one of the positive electrode and the negative electrode with a respective negative electrode or positive electrode in a state in which the separator is between the positive and the negative electrodes,
  wherein step (a) to step (d) are performed within the continuous process line.

8. The electrode assembly manufacturing method according to claim 7, wherein step (b) and step (c) are simultaneously performed.

9. The electrode assembly manufacturing method according to claim 7, wherein
   step (b) and step (c) are sequentially performed,
   step (b) is performed using a first ultrasonic cutter, and
   step (c) is performed using a second ultrasonic cutter.

10. The electrode assembly manufacturing method according to claim 7, wherein a vibration direction of the ultrasonic cutter is a direction perpendicular to a direction the electrode sheet is conveyed in step (a).

11. The electrode assembly manufacturing method according to claim 7, wherein step (b) comprises forming a recess configured to guide the cutting of the electrode sheet into the positive electrode or the negative electrode in step (c).

12. The electrode assembly manufacturing method according to claim 7, wherein step (b) includes pushing the cutting edge of the ultrasonic cutter once in a state in which a cutting edge of the ultrasonic cutter is placed on an outer surface of the electrode sheet to form an outer periphery of a unit electrode in a direction in which the electrode tab is formed.

13. The electrode assembly manufacturing method according to claim 7, wherein the electrode sheet extends directly over the separator during step (c) such that the one of the positive electrode or the negative electrode lies on the separator upon completion of step (c).

* * * * *